United States Patent [19]

Hilsum

[11] 3,753,231

[45] Aug. 14, 1973

[54] ELECTROLUMINESCENT DEVICES

[75] Inventor: Cyril Hilsum, Malvern, England

[73] Assignee: The Secretary of State for Defense in her Britannic Majesty's Government of the United Kingdom of Great Britain and Northern Ireland

[22] Filed: Oct. 4, 1971

[21] Appl. No.: 186,366

[52] U.S. Cl. ........................ 340/166 EL, 315/169 R

[51] Int. Cl. ........................ G08b 5/22, H05b 37/00

[58] Field of Search .................. 340/166 R, 166 EL, 340/173, 324 R, 324; 315/169; 178/7.3 D

[56] References Cited

UNITED STATES PATENTS

| | | | |
|---|---|---|---|
| 3,388,292 | 6/1968 | Burns | 340/324 M |
| 3,564,135 | 2/1971 | Weimer | 178/7.3 D |
| 3,673,572 | 6/1972 | Sliva | 340/166 EL |
| 3,209,229 | 9/1965 | Cox, Jr. | 340/324 M X |

*Primary Examiner*—Donald J. Yusko
*Attorney*—Moore & Hall

[57] ABSTRACT

An electroluminescent device includes a first plurality of conductors, a second plurality of conductors forming a plurality of pairs of intersections with the first plurality of conductors, each pair of intersections having associated with it a combination of a region of electroluminescent material connected in electrical series with a solid state memory switch, the said combination being connected between a first conductor and a second conductor, and an electrical connection from the said combination to a third conductor, means for applying a voltage to which the region of electroluminescent material is responsive between the first conductor and the second conductor and means for applying electrical pulses between the first conductor and the second conductor having sufficient magnitude to switch the solid state memory switch between its conducting state and its impeding state. The said electrical connection may contain a solid state threshold switch or an electrical capacitor. The members of the first plurality of conductors may all be parallel and the members of the second plurality of conductors may all be parallel and the first plurality of conductors may be perpendicular to the second plurality of conductors.

10 Claims, 5 Drawing Figures

ELECTROLUMINESCENT DEVICES

BACKGROUND OF THE INVENTION

The present invention relates to electroluminescent devices.

Much interest has been shown recently in solid state display systems mainly in order to develop alternatives to cathode ray tube displays. Solid state display systems have the advantages of operation at low voltage levels and of potential cheapness of manufacture and of potential reliability. One particular solid state display system of interest is the electroluminescent display system in which light is emitted from regions of phosphor, such as zinc sulphide, by applying voltages across the regions of phosphor by means of an arrangement of conductors forming the control circuits.

In designing an electroluminescent display system, one of the major problems encountered is concerned with the number of control circuits. If the system has only a small number of the light emitting regions of phosphor then it is possible to make a pair of connections to each particular region. However, when the number of regions is large this arrangement becomes too difficult. It may be overcome by using a single connection to all the regions in a particular row and a similar connection to all the regions in a particular column in a cartesian fashion, whereby in a display panel of nxn light emitting regions or elements, only $2n$ control circuits are required instead of $n^2$. However, in this crossed grid control arrangement further severe problems concerned with brightness and contrast are encountered. When nxn elements are repetitively scanned a voltage appears across each region for a time only in the order of $t/n^2$ where t is the total scanning time. Therefore, the mean intensity per unit scanning time of light emitted by each element is very limited.

It is possible to use phosphors which are capable of high brightness operation for a sustained period. This, however, does not provide an adequate solution to the problems. The phosphors have high electrical capacitances and are therefore liable to pick up stray charges and since the brightness of light provided by the phosphors is, in general, a smooth function of the applied voltage, elements which should be in the OFF state may have a brightness of about a half that of the ON state. Consequently, it is necessary to connect a non-linear control device in series with each element to help reduce the voltage across each element when it should be in the OFF state. The control devices are designed to present a relatively low resistance when the element should be in the ON state and a relatively high resistance when the element should be in the OFF state. In other words, the resistance of the control device is a steep function of the brightness provided by the element. The resistnace added by the control device may also help maintain the voltage across the elements at a high level for relatively long time by a memory action.

A solid state switch is one example of a control device. The present form which these switches take is that of a glassy semiconductor material. There are two main types of switch, namely the threshold and the memory switch. Glassy semiconductor switches of the first main type, the threshold switch, remain in a resistive state for applied voltages below a first threshold. Above this threshold the material switches to a conducting state, and when connected to a typical load the voltage appearing across them falls since the impedance of the devices becomes smaller than the load. The conducting state continues when the magnitude of the current is reduced, but below a certain holding current the state of the material reverts once more to the resistive state. Glassy semiconductor switches of the second main type, the memory switch, are similar in performance but show the important difference of remaining in the conducting state even when the current approaches zero. They can be converted back into the resistive state by a large current pulse.

Electroluminescent displays using solid state switches connected to the light-emitting elements have been proposed but have only been shown to work satisfactorily during AC operation. Threshold glassy solid state switches have been used and these are bistable during AC operation. This means that they turn the light-emitting elements on twice per cycle. However, a DC operated electroluminescent display based on solid state switching devices presents difficulties. The use of presently developed threshold switches is hindered because the holding current is typically a few milliamps and above, whereas electroluminescent elements presently operate at typically a few microamps. (Threshold switches with holding currents of about 100 microamps have, however, been reported recently). Use of a set of memory switches is also hindered by the problem that the switches which are in the ON state at the end of each frame-scan need to be turned off; this can only be done by passing a large current pulse, and since each switch is in series with one electroluminescent element, large currents cannot be passed.

SUMMARY OF THE INVENTION

According to the present invention there is provided an electroluminescent device including a first plurality of conductors, and a second plurality of conductors forming a plurality of pairs of intersections with the first plurality of conductors. Each pair of intersections has associated with it a combination of a region of electroluminescent material responsive to a direct voltage and connected in electrical series with a solid state memory switch having a conducting state and an impeding state, the said combination being between a first conductor and a second conductor. An electrical connection is provided from the said combination to a third conductor. A voltage to which the region of electroluminescent material is responsive is applied between the first conductor and the second conductor, and electrical are applied between the first conductor and the third conductor having sufficient magnitude to switch the solid state memory switch between its conducting state and its impeding state.

The members of the first plurality of conductors may be parallel to one another.

The members of the second plurality of conductors may be parallel to one another.

The first plurality of conductors may be perpendicular to the second plurality of conductors.

The electrical connection from the third conductor to the said combination of the region of electroluminescent material connected in electrical series with the solid state memory switch may contain either a solid state threshold switch or an electrical capacitor.

The solid state memory switch may be a region of glassy semiconductor material.

The solid state threshold switch may be a region of glassy semiconductor material.

BRIEF DESCRIPTION OF THE DRAWINGS

Embodiments of the invention will be described by way of example with reference to the accompanying drawings, in which.

DESCRIPTION OF THE PREFERRED EMBODIMENTS

The best known form of electroluminescence involves the excitation of a phosphor by an electrostatic field. The phosphor may be in the form of a suspension of particles in a binding medium or in the form of a thin film. The best known phosphor is zinc sulphide. Its lattice may be modified by adding other atoms, replacing some of the zinc or sulphur atoms. Phosphors designed for DC operation (which are required for use in embodiments of the present invention) are fabricated somewhat differently from those designed for AC operation. One particular high brightness DC phosphor is formed by zinc sulphide activated by copper and manganese and suspended in an organic binder, for example polymethyl-methacrylate. This may be formed by making a slurry of pure zinc sulphide powder with water and adding controlled quantities of copper and manganese. The slurry is then dried, ground, sieved and fired at about 900° C in a controlled atmosphere of air. Alternatively copper may be evaporated from solution on the surface to give a steep concentration gradient of copper at the surface of the material. The phosphor is then mixed with a fixed weight of the organic binder, and the resultant mixture dried.

Glassy solid state threshold and memory switches usually consist of material with no definite lattice periodicity but with a short range order or microscopic periodicity. The effect is that they can be switched between the two stable states of conductivity, namely a resistive state and a conductive state, by applying suitable voltages. The voltages may bring about changes which may include electronic changes, microscopic thermal effects and polymeric bond rotation.

Figure 1:
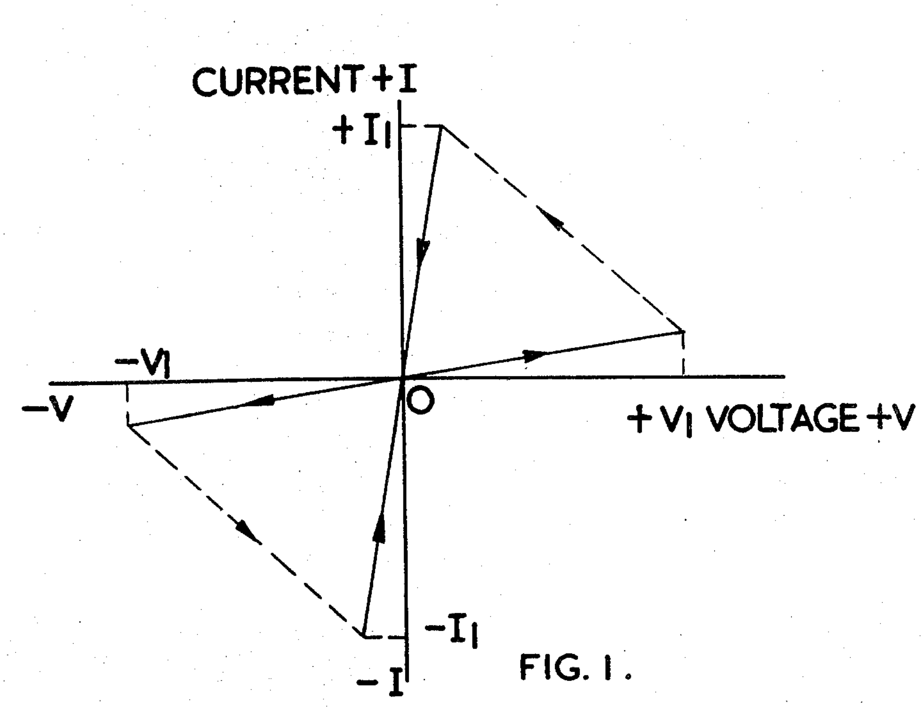
FIG. 1 and FIG. 2 are idealized graphs of current plotted against voltage for a typical solid state memory switch respectively in series with a typical load resistance.

FIG. 1 is an idealized graph of current plotted against voltage for a typical solid state memory switch in series with a typical load resistance. When the voltage across the switch is increased initially from zero, the current increases slowly. This is the resistive state. When a threshold voltage $+V_1$ is reached the current immediately increases to a high value $+I_1$, and the voltage across the switch falls because the impedance presented by the switch becomes smaller than that of the load. If the voltage is now reduced to zero the change in current per unit change in voltage remains high. This is the conductive state. A large current pulse is required to convert the device back to its resistive state. If the voltage is initially increased in a negative direction from zero, a symmetrical effect (about the origin) occurs to the graph. The change in current per unit change in voltage assumes a low negative value, equal and opposite to the value for voltages increasing from zero. At a threshold voltage $-V_1$ the current assumes a high value $-I_1$. If the negative voltage is then reduced towards zero then the change in current per unit change in voltage remains at a high negative value, equal and opposite to that for reductions in voltage from $+V_1$.

Figure 2:
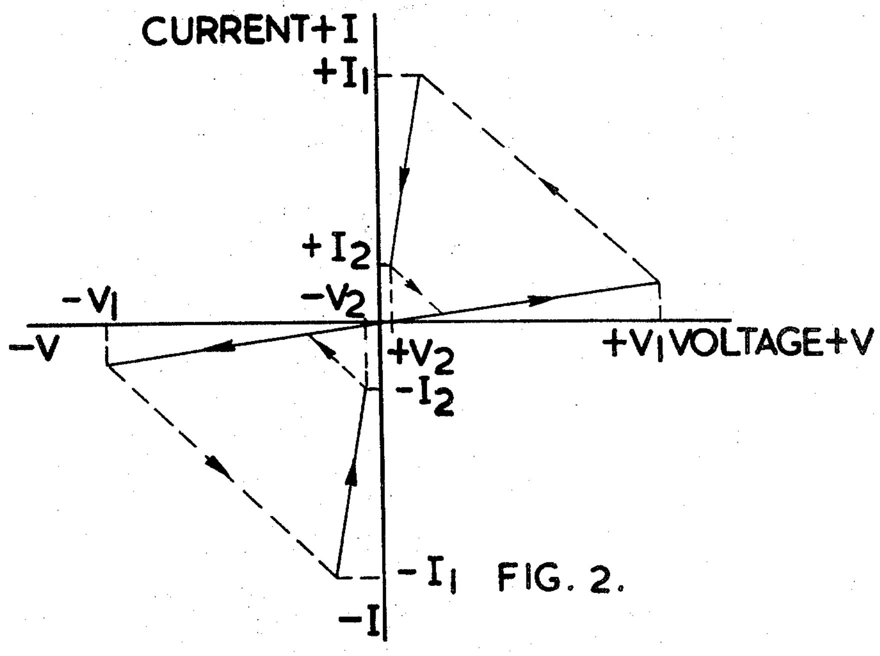

FIG. 2 is a graph of current plotted against voltage for a typical solid state threshold switch in series with a typical load resistance. The operation of the threshold switch is very similar to that of the memory switch. The main difference is that when the positive or negative voltage (as appropriate) is reduced to zero, there is a switch from the low resistivity portion of the graph, to the high resistivity portion at a certain holding current $I_2$. At a voltage $+V_2$ and current $+I_2$ the current falls to a point on the graph having a small change in current per unit change in voltage. Similarly, at a voltage $-V_2$ and current $-I_2$ the current falls to a low negative value on the branch of the graph having a small negative change in current per unit change in voltage. In other words the voltages, $\pm V_2$ are threshold voltages, and if the magnitude thereof falls below the threshold then the device is switched from the conductive to the resistive state.

The form of the graphs in a practical situation is slightly different from FIG. 1 and FIG. 2, (for instance the low conductivity branches tend to tail off exponentially) but these differences do not affect the description of the operation of the devices to any serious degree.

Solid state glassy switches have the advantages that they can be fabricated by a known technology common to both threshold and memory switches and may be deposited in the form of thin films and in such a form are compatible with microelectronic techniques.

One particular alloy known to give the required switching characteristics is that of arsenic, tellurium and germanium. In the latter alloy atomic proportions of 81%Te: 15%Ge: 4%As are suitable for a memory switch. If the proportion of As to Te is changed to about 48%Te: 30%As and 12%Si is added (together with 10%Ge again) then the material is suitable for a threshold switch. The elements of the alloys are combined together and layers of material forming the switches are deposited on a substrate in a known way.

Figure 3:
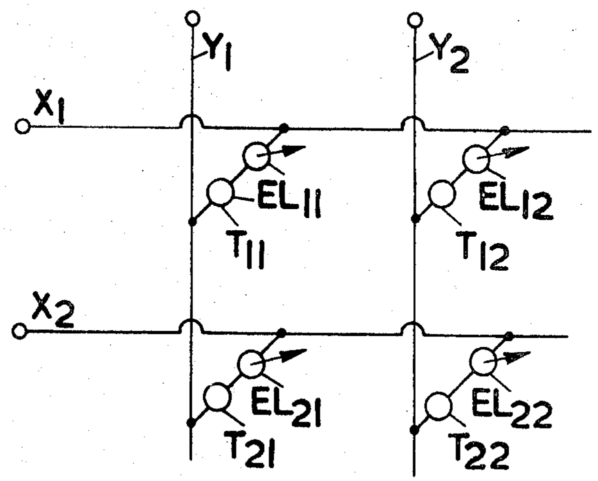
FIG. 3 is a circuit diagram of a known electroluminescent device.

FIG. 3 is a circuit diagram of a known electroluminescent display device. A series of horizontal conductors X1,X2 forms a grid arrangement with a series of vertical conductors Y1,Y2 At the intersection point of each X conductor and each Y conductor is a series combination of a solid state threshold switch and an electroluminescent element. A solid state threshold switch T11 and an electroluminescent element EL11 are at the intersection between the conductor X1 and the conductor Y1. Similarly, solid state threshold switches T12, T21 and T22 and electroluminescent elements EL12, EL21 and EL22 are at the intersections between the conductors X1 and Y2, X2 and Y1 and X2 and Y2 respectively.

A voltage pulse is applied between an X conductor and a Y conductor so that the appropriate combination of an electroluminescent element and a solid state threshold switch at the intersection of the conductors may be energized. For example, a pulse applied between the conductor $X_1$ and the conductor $Y_2$ energizes the combination of the threshold switch $T_{12}$ and the element $EL_{12}$. After the pulse has been removed the threshold switch helps maintain a high voltage level across the electroluminescent element for a relatively long time. As the voltage decays the threshold switch turns itself off.

The device has the disadvantage that the threshold switches cannot operate satisfactorily with holding currents ($I_2$ of FIG. 2) in the order of a few microamps, at which the electroluminescent elements usually operate.

If the solid state threshold switches are replaced by solid state memory switches then any problem due to the different operating current levels is overcome. Appropriate voltage pulses are again applied to the intersections of those X and Y conductors which are required to be energized. These pulses turn the memory switches at the intersections into their high conductivity state. When that happens there is only a small voltage drop across each memory switch, so a large voltage appears across the corresponding electroluminescent element. For example, if about 60 volts is applied across the combinations, at the intersections of the X and Y conductors, the memory switch may account for 10 volts leaving 50 volts to appear across the electroluminescent element. In this system, however, there is no easy way of converting the switches back to the resistive state,.

Figure 4:
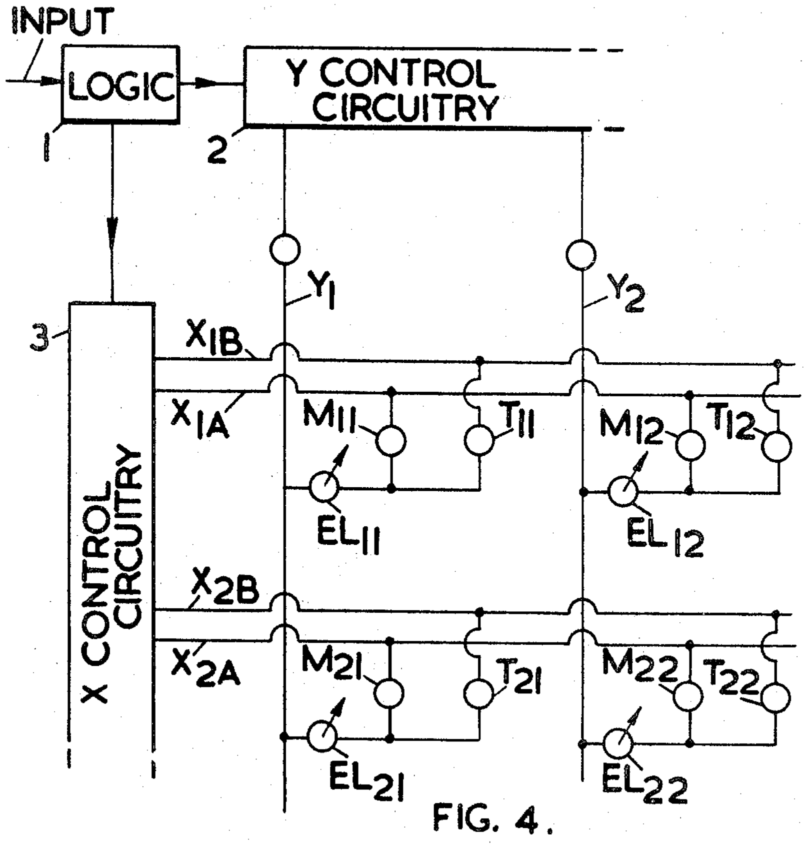
FIG. 4 is a circuit diagram of an electroluminescent device embodying the present invention.

FIG. 4 is a circuit diagram of part of a device embodying the present invention. A series of vertical conductors, Y1, $Y_2$ forms a matrix of intersection points with a series of horizontal conductors, $X_{1A}$, $X_{2A}$ and with a series of horizontal conductors X1B, X2B. The conductors X1A and X1B form a pair and the conductors X2A and X2B form a pair. At the intersection between each Y conductor and the second conductor of each pair of X conductors is a series combination of a solid state memory switch and an electroluminescent element. For instance, a solid state memory switch M11 and an electroluminescent element EL11 are connected between the conductor X1A and the conductor Y1, Also a solid state memory switch M21 and an electroluminescent element EL21 are connected between the conductor X2A and the conductor Y1. Likewise, a solid state memory switch M12 and an electroluminescent element EL12 are connected between the conductor X1A and the conductor Y2, and a solid state memory switch M22 and an electroluminescent element EL22 are connected between the conductor X2A and the conductor Y2. A solid state threshold switch is connected between the first conductor of each pair of X conductors and each series combination of a solid state memory switch and an electroluminescent element. For instance, a solid state threshold switch T11 is connected between the conductor X1B and the solid state memory switch M11 and the electroluminescent element EL11. Also, a solid state threshold switch T21 is connected between the conductor X2B and the solid state memory switch M21 and the electroluminescent element EL21. Likewise, a solid state threshold switch T12 is connected between the conductor X1B and the electroluminescent element EL12 and the solid state memory switch M12, and a solid state threshold switch T22 is connected between the conductor X2B and the electroluminescent element EL22 and the solid state memory switch M22.

A first method of operating the circuit described with reference to FIG. 4 is as follows. Input signals are applied to a logic network 1 which is used to select which intersection in the matrix is to be energized. Signals from the logic network 1 are passed to Y control circuitry 2 and X control circuitry 3 in order to apply voltage pulses across the appropriate intersections in a standard manner (the pulses are of length typically about 1 millisecond with a slow decaying edge). One particular method known as the "linescan" technique is to use one X conductor such as the conductor X1A and the series of Y conductors Y1, Y2 applying voltage pulses across the required intersections, say Y1, Y3, Y5, (Y3, Y5 not shown) as they are reached. Then the next conductor X2A can be used with voltage pulses applied between it and the appropriate Y conductors in turn. In this way the whole matrix can be scanned. The series of conductors X1B, X2B and the connections to each memory switch and each electroluminescent element containing the solid state threshold switches, T11, T21, T12, T22 are used to help erasure at the end of each linescan or framescan. Supposing that the memory switches M11 and M21 are in their highly conductive state (i.e. ON) and the memory switches M12 and M22 are in their highly resistive state (i.e. OFF) at the end of a particular frame, and it is necessary to switch the memory switches M11 and M21 to their OFF state without switching the memory switches M12 and M22 to their ON state. In other words, the whole matrix needs to be OFF at the end of each frame so that any changes in the electroluminescent array of elements which are ON between one frame and the next may be allowed for. A pulse is applied between the conductor X1A and the conductor X1B and a pulse is applied between the conductor X2A and the conductor X2B. The pulses are generated by standard means within the X control circuitry 3. These pulses are applied at the end of the frame and may be applied across each pair of X conductors simultaneously. The magnitude of each pulse is large enough to give a current magnitude greater than the magnitude needed to switch the memory switches M11, M12, M21, M22 and the threshold switches T11, T21, T12, T22

Typically a pulse of 100 milliamps for 1 microsecond having a very sharp trailing edge is required. The memory switches M11 and M21 are switched to their OFF state during the trailing edge of the current pulse while the threshold switches T11 and T21 are switched to their ON state. The magnitude of the pulse across the threshold switches T11 and T21 falls at a rate determined by the capacitance of the electroluminescent elements EL11 and EL21 until the current reaches the holding value, I2 (FIG. 2). The switches T11 and T21 then switch themselves off again. They are on, however, long enough for the memory switches M11 and M21 which are initially ON to be isolated from the memory switches M21 and M22 which are initially OFF so that the former only are switched to the OFF state. The pulses applied between the pairs of X conductors are not sufficient to switch series combinations of the memory switches M12, M22 which are intiially in the OFF state and the threshold switches T21, T22 all to the ON state. The voltage gradient would need to be approximately twice that applied across M11 and T11 for this to happen. Consequently all the memory switches M11, M21, M12, M22 are re-set to the OFF state. The rate of fall of the current pulse is important; it needs to be fast; this, however is assured by the rapid rise of voltage on the threshold switches T11 and T21 as they switch to the OFF state.

It is possible to perform the same operation by replacing the threshold switches T11, T21, T12, T22 by a series of isolating capacitors. These would act in the same way. They would isolate each combination of an electroluminescent element and a memory switch allowing the memory switches which are in the ON state to be turned to the OFF state; the voltage across them would gradually decrease to zero and they would present sufficient impedance in series with that of a memory switch in the OFF state to prevent the latter from being switched to the ON state. The capacitance C of the capacitors would vary from one case to another, but it would be chosen in consideration of size and capacitance of the electroluminescent elements and the resistance R of the memory switches. A typical value is a few picofarads. Fast operating times would require the product RC to be small.

A second method of operating the circuit described with reference to FIG. 4 is as follows. Suppose that the solid state memory switches, the solid state threshold switches and the electroluminescent elements are all in the OFF state. In order to operate say the electroluminescent element EL11 a large voltage (about 100 volts) is applied (by means of the control circuitry 2,3) between the conductor Y1 and the conductor X1A. During the application of that voltage a voltage pulse is applied (by means of the control circuitry 3) between the conductor X1A and the conductor X1B. The pulse is sufficient to switch the threshold switch T11 into the ON state. A typical voltage pulse would have a magnitude of about 80 volts and a duration of about 1 microsecond. When the threshold switch T11 is in the ON state a large proportion of the potential difference between the conductor Y1 and the conductor X1A appears across the memory switch M11, so that the memory switch M11 is switched into the ON state. At the end of the voltage pulse applied between the conductor X1A and the conductor X1B the threshold switch T11 is switched into the OFF state because no holding current is then passing through the threshold switch T11. The memory switch M11 remains in the ON state however. While the memory switch M11 is in the ON state the electroluminescent element EL11 is operated because the voltage between the conductor X1A and the conductor Y1 remains high.

When it is desired to switch the electroluminescent element EL11 and the memory switch M11 into the OFF state another pulse, typically about 80 volts for about 1.5 microseconds, is applied between the conductor X1A and the conductor X1B. This pulse switches the threshold switch T11 into the ON state again. When the threshold switch is in the ON state the voltage across the memory switch M11 rises so that the memory switch M11 is switched back into its OFF state. The threshold switch T11 is switched back into its OFF state at the end of the pulse. The intensity of the light emitted by the electroluminescent element EL11 decays after the memory switch M11 and the threshold switch T11 have been switched into the OFF state.

When using the second mode of operation the potential of the conductor Y1 is always kept positive with respect to that of the conductor X1A and the conductor X1B. During periods when it is not necessary to operate any of the intersections between the conductor Y1 and the X conductors the potential between the conductor Y1 may be reduced to about 70 volts in order that a serious reduction in brightness of the light emitted by the electroluminescent elements at those intersections does not occur by continual operation at a high voltage.

When using this second method of operation the intersections other than that containing the electroluminescent element EL11, the memory switch M11 and the threshold switch T11 may all be addressed and erased in a fashion similar to that described for the intersection containing the electroluminescent element EL11, the memory switch M11 and the threshold switch T11. The addressing and erasing operation of the electroluminescent device as a whole may be performed in a standard manner such as by the "linescan" method.

In this second method of operation the positions in the circuit described with reference to FIG. 4 of the threshold switches and the memory switches at each intersection are interchangable. For instance, the position of the memory switch M11 is interchangable with that of the threshold switch T11, the position of the memory switch M12 is interchangable with that of the threshold switch T12, the position of the memory switch M21 is interchangable with that of the threshold switch T21 and the position of the memory switch M22 is interchangable with that of the threshold switch T22.

Furthermore the second method of operation of the circuit described with reference to FIG. 4 may be performed in a circuit alternative to that of FIG. 4. Such an alternative circuit is a modification of that described with reference to FIG. 4 and in which the position of the electroluminescent elements and the memory switches are interchanged at each intersection. This means that in the circuit described with reference to FIG. 4 the position of the electroluminescent element EL11 is interchanged with that of the memory switch M11, the position of the electroluminescent element EL12 is interchanged with that of the memory switch M21 and the position of the electroluminescent element EL22 is interchanged with that of the memory switch M22 to form the alternative circuit. In this form each intersection operates generally by the same method as the above described second method of operation of the circuit described with reference to FIG. 4. In this case, however, the role of the conductors is interchanged. Suppose that it is necessary to operate the electroluminescent element EL11. The large voltage (about 100 volts) is here applied between the conductor Y1 and the conductor X1A and the voltage pulses used for switching the threshold switch T11 and the memory switch M11 between the ON and OFF states are applied between the conductor Y1 and the conductor X1B. The conductor X1A is always kept at a positive potential with respect to the conductor X1B.

Figure 5:
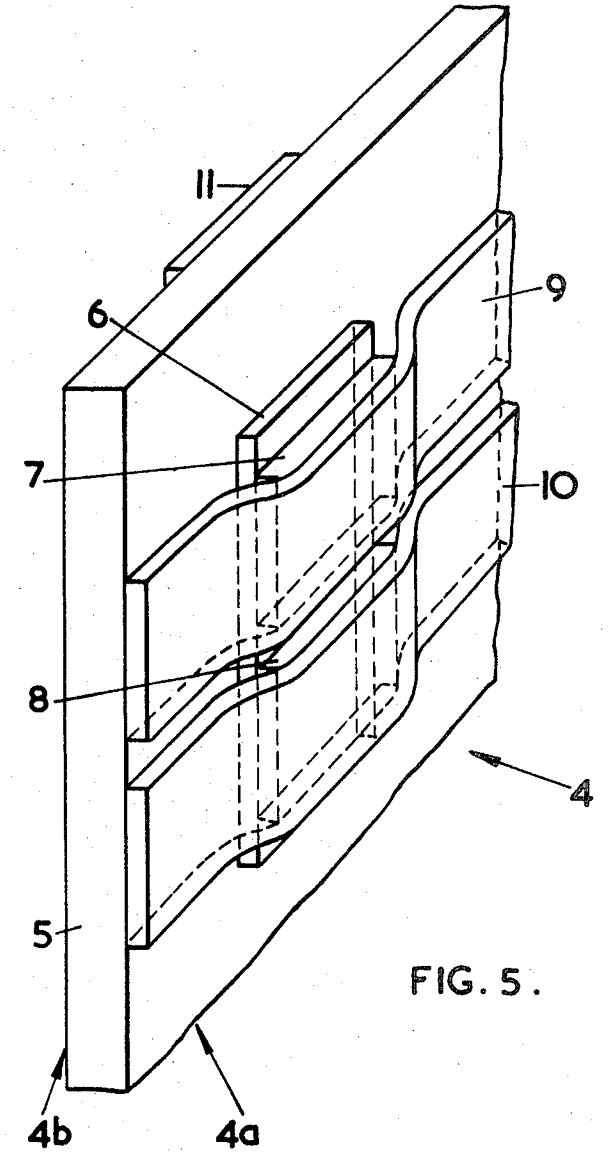
FIG. 5 is a perspective view of part of an electroluminescent device.

FIG. 5 is a perspective view of part of an electroluminescent device. It illustrates the fabrication of the device of the circuit diagram of FIG. 4. A display panel 4 having a front face *4a* and a rear face *4b* contains a central layer 5 which is an electroluminescent phosphor medium which may be prepared as described above (i.e. it may be zinc sulphide doped with copper and manganese and suspended in polymethyl methacrylate). The electroluminescent material may be localized in certain active regions of the layer 5. The regions of electroluminescent material represent the electroluminescent elements EL of FIG. 4. A conducting layer 6 which forms the common electrical point between the element EL11 and switch M11 in FIG. 4 is deposited on one surface of the layer 5.

Material suitable for a glassy solid state memory switch is deposited in a layer 7 (which forms the switch M11 of FIG. 4) across part of the upper region of the surface of the conducting layer 6 and material suitable for a glassy solid state threshold switch is deposited in a layer 8 (which forms the switch T11 of FIG. 4) across part of the lower region of the surface of the conducting layer 6. An electrode 9 (which forms the conductor X1A of FIG. 4) runs horizontally across the panel 4 on the surface of the layer 5 but overlies the layer 7 of material suitable for a glassy solid state memory switch. Likewise, an electrode 10 (which forms the conductor X1B of FIG. 4) runs horizontally across the panel 4 on the surface of the layer 5 and overlies the layer 8 of material suitable for a glassy solid state threshold switch. An electrode 11 (which forms the conductor Y1 of FIG. 4) is deposited on the rear face of the panel 4 and runs vertically across the region of the layer 5 covered on the front face by the conducting layer 6. The conducting layer 6 and the electrodes 9 and 10 may be of molybdenum deposited by covering the whole surface of the layer 5 (first to form layers such as the conducting layer 6 then to form electrodes such as the electrodes 9 and 10) and using standard photolithography and etching techniques. Likewise the layers 7 and 8 of materials suitable for solid state switches may be deposited through a mask or by covering the whole surface (part of which is not shown) and using known photolithography and etching techniques. The electrode 11 is made of transparent material such as tin oxide.

The complete panel 4 (part of which is not shown in FIG. 5) represents the complete matrix (part of which is not shown) of FIG. 4. The complete matrix is formed by repeating the arrangement shown in FIG. 5 across the whole area of the panel 4, in an identical manner, namely with the electrodes 9 and 10 and other pairs of electrodes identical with them also running horizontally forming all the X conductors of the matrix and the electrode 11 and the other identical electrodes also running vertically forming all the Y conductors, the layers 7, 8 and the other layers identical with them forming the solid state switches, and the layer 6 and the other conducting layers identical with the layer 6 forming the common points between each memory switch and each electroluminescent element.

The panel 4 may be modified such as by depositing the whole structure on a substrate such as glass. The layer 8 forming the threshold switch and all other threshold switch layers (not shown) may be replaced by thin film capacitors deposited by standard techniques.

In operation, light is emitted from the rear face 4*b* of the panel 4. It is emitted from the front face 4*a* also if the materials of the layers 6,7 and of the electrode 9 are transparent.

We claim:

1. An electroluminescent display device operable using unidirectional operating voltages and comprising a first plurality of control conductors, a second plurality of control conductors forming a plurality of intersections with the first plurality of control conductors, each of said intersections being associated with an electrical combination consisting of a region of electroluminescent phosphor material of the kind providing light emission in response to an applied unidirectional operating voltage and electrically connected to an electrically reversible solid state memory switch of the kind having a conducting state and an impeding state and requiring substantially no electrical holding current to hold said solid state memory switch in its conducting state, said electrical combinations being connected to said conductors with the region of electroluminescent phosphor material belonging to each of said intersections being electrically connected to one of said first plurality of control conductors and the solid state memory switch belonging to each of said intersections being electrically connected to one of said second plurality of control conductors, a third plurality of control conductors, a plurality of electrical connections disposed respectively between one of said third plurality of control conductors and the junction between each region of electroluminescent phosphor material and its associated solid state memory switch, first pulse means for applying between at least one of said second plurality of control conductors and at least one of another of said pluralities of control conductors a first electrical pulse capable of switching the solid state memory switch belonging to at least one selected intersection from its impeding state to its conducting state, means for applying between at least one of said first plurality of control conductors and said at least one of said second plurality of control conductors a unidirectional operating voltage while said solid state memory switch belonging to said at least one intersection is in its conducting state, said unidirectional operating voltage being operative to produce emission of light from the region of electroluminescent phosphor material belonging to said at least one intersection, and second pulse means for applying between said at least one of said second plurality of control conductors and at least one of another of said pluralities of control conductors a second electrical pulse operative to switch the solid state memory switch belonging to said at least one selected intersection from its conducting state into its impeding state.

2. An electroluminescent display device as claimed in claim 1 wherein said electrical combinations are arranged in a matrix.

3. An electroluminescent display device as claimed in claim 2 wherein said first plurality, said second plurality, and said third plurality of control conductors form an integrated display panel structure with said matrix.

4. An electroluminescent device as claimed in claim 3 and wherein said first plurality of control conductors are parallel with one another, said second plurality of control conductors being parallel with one another, and said third plurality of control conductors being parallel with one another.

5. An electroluminescent display device as claimed in claim 4 and wherein said second plurality of control conductors is parallel with said third plurality of control conductors, and said first plurality of control conductors is perpendicular to said third plurality of control conductors.

6. An electroluminescent display device as claimed in claim 1 wherein said first pulse means is arranged to apply said first electrical pulse between at least one of said second plurality of control conductors and at least one of said third plurality of control conductors.

7. An electroluminescent device as claimed in claim 6 wherein said second pulse means is arranged to apply said second electrical pulse between at least one of said second plurality of control conductors and at least one of said third plurality of control conductors.

8. An electroluminescent device as claimed in claim 6 wherein said second pulse means is arranged to apply said second electrical pulse between at least one of said second plurality of control conductors and at least one of said first plurality of control conductors.

9. An electroluminescent device as claimed in claim 5 wherein said plurality of electrical connections form part of said integrated display panel structure, each of said electrical connections containing an electrically reversible solid state threshold switch of the type having a conducting state and an impeding state and requiring an electrical current to hold said solid state threshold switch in its conducting state.

10. An electroluminescent display device as claimed in claim 5 wherein said plurality of electrical connections form part of said integrated display panel structure, each of said electrical connections containing an electrical capacitor.

* * * * *